Figure 1:
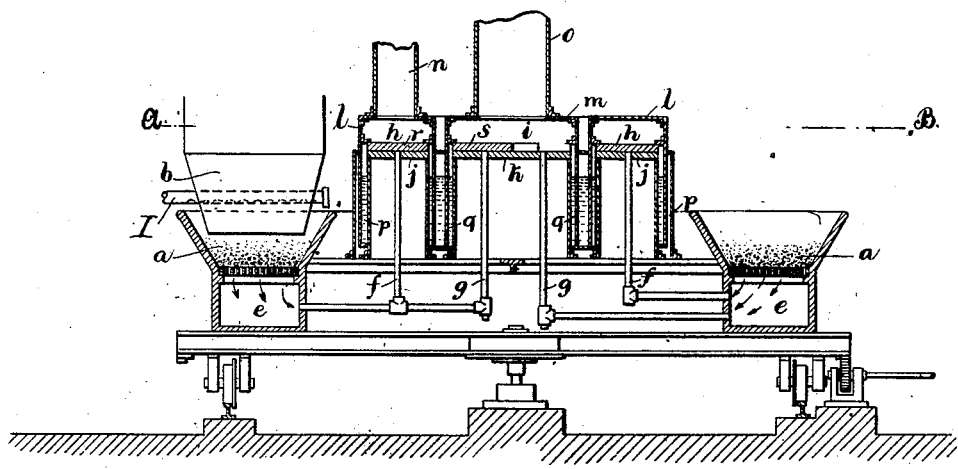

F. VON SCHLIPPENBACH.
PROCESS AND APPARATUS FOR ROASTING ORES AND RECOVERING THE GASES THEREFROM.
APPLICATION FILED FEB. 12, 1910.

1,069,191.

Patented Aug. 5, 1913.

4 SHEETS—SHEET 1.

Witnesses.
L. H. Barlow
C. A. Hennessy

Inventor
Felix von Schlippenbach

Attorneys

F. VON SCHLIPPENBACH.
PROCESS AND APPARATUS FOR ROASTING ORES AND RECOVERING THE GASES THEREFROM.
APPLICATION FILED FEB. 12, 1910.

1,069,191.

Patented Aug. 5, 1913.

4 SHEETS—SHEET 2.

F. VON SCHLIPPENBACH.
PROCESS AND APPARATUS FOR ROASTING ORES AND RECOVERING THE GASES THEREFROM.
APPLICATION FILED FEB. 12, 1910.

1,069,191.

Patented Aug. 5, 1913.

4 SHEETS—SHEET 3.

F. VON SCHLIPPENBACH.
PROCESS AND APPARATUS FOR ROASTING ORES AND RECOVERING THE GASES THEREFROM.
APPLICATION FILED FEB. 12, 1910.

1,069,191.

Patented Aug. 5, 1913.

4 SHEETS—SHEET 4.

Witnesses
L. H. Barlow
C. A. Hennessy

Inventor
Felix von Schlippenbach by Attorneys

UNITED STATES PATENT OFFICE.

FELIX VON SCHLIPPENBACH, OF STOLBERG, GERMANY.

PROCESS AND APPARATUS FOR ROASTING ORES AND RECOVERING THE GASES THEREFROM.

1,069,191.

Specification of Letters Patent.

Patented Aug. 5, 1913.

Application filed February 12, 1910. Serial No. 543,454.

*To all whom it may concern:*

Be it known that I, FELIX VON SCHLIPPENBACH, a subject of the Emperor of Germany, residing at Stolberg, Binsfeldhammer, Rhineland, Germany, have invented a certain new and useful Process and Apparatus for Roasting Ores and Recovering the Gases Therefrom, of which the following is a specification.

There are known certain roasting and oxidizing processes in which a certain amount of the material to be roasted is exposed to an air current until completely roasted, after which the roasted material is removed from the roasting place and fresh ore is introduced to be treated. In these processes the gases produced during a certain time from the beginning of the operation are sufficiently rich in sulfur dioxid to be availed of for the manufacture of sulfuric acid. This stage of the operation having passed, however, the percentage of sulfur dioxid in the roasting gases decreases to such a degree as to render the gases unfit for the manufacture of sulfuric acid. During the lapse of time which is necessary for removing the treated matter from the roasting place and for charging fresh material, no roasting gases are developed at all. Thus, in these roasting processes, a current of gas is obtained which is intermittent and very varying as to its content of sulfur dioxid, and its utilization for the manufacture of sulfuric acid has not been possible hitherto.

In operating the above mentioned roasting processes, the best known of which is the Huntington-Heberlein process, until now tilting pots (converters) were generally made use of, one plant being in most cases provided with several of these pots. For carrying out said roasting processes, certain devices have also been adopted recently, in which the material to be roasted is charged through a stationary charging device to a grate which is caused to move underneath past said device, or upon a stationary grate by means of a movable charging device which is caused to pass above said grate. In these recently used roasting devices which in contradistinction to the pots may be called automatic mechanical roasting apparatus, the roasting progresses gradually from the point where fresh matter is charged to the point where the treated material is discharged. The material is thus undergoing different roasting stages between the points where it is fed and where it is discharged, so that upon the section of the grate nearest to the feeding point, gases with the highest percentage of sulfur dioxid are produced, whereas the richness of the gases in sulfur dioxid decreases gradually in proportion as the respective grate section is nearing the point of discharge. With such mechanical roasting apparatuses a continuous gas current can be obtained, but this gas current consists of a mixture of gases rich in sulfur dioxid and of gases poor in sulfur dioxid, the yield of sulfur dioxid of this gas mixture thus being too low to be made use of for the manufacture of sulfuric acid.

Now the object of the present invention is not only to secure an uninterrupted gas current, but also to separate from it that part of the roasting gases which is too poor in sulfur dioxid to be availed of for the manufacture of sulfuric acid, or the sulfur dioxid percentage of which is so low that when mixed with the gas rich in sulfur dioxid a gas mixture would be obtained quite unfit for the manufacture of sulfuric acid.

The object of the invention is thus to provide an uninterrupted gas current sufficiently rich in sulfur dioxid as to allow of its utilization for the manufacture of sulfuric acid.

With a view to attain this object the present invention provides special collecting places or chambers for the gases rich in sulfur dioxid (called hereafter "rich gases") on the one hand, and for the gases of a low percentage of sulfur dioxid (hereafter called "poor gases") on the other hand. From the different places where the gases are developed (called hereafter "roasting places") they are directed to these collecting chambers, provision being made to always forward to one and the same collecting chamber an uninterrupted current of gas of equal quality i. e. of rich or of poor gas. In order to obtain this uninterrupted current of gas of the same kind, each roasting place may be connected with each collecting chamber by means of a separate conduit, each of these conduits being closed and opened by an appropriate device. Now, during the operation, according to the state of the roasting process at one given roasting place, care will be taken to close either the conduit for the poor gases corresponding to this place and to open simultaneously the conduit for the rich gases, or vice versa. Thus, as soon as the roasting operation at a roasting place which has been previously in communication with the collecting chamber for rich gases, has reached the period during which poor gases will be developed, the communication of this roasting place with the collecting chamber for rich gases will have to be interrupted and that with the collecting chamber for poor gases opened.

In the above mentioned "mechanical" roasting devices, owing to the peculiar nature of the operation taking place thereupon, there always exists the condition, that one group of the roasting places is continuously developing rich gases, and the other group poor ones. Upon the grate of these mechanical roasting devices there are constantly, on the one hand, sections upon which rich gases are being formed, and on the other hand, sections at which poor gases are produced. For this reason the present invention is adaptable to such mechanical roasting devices without requiring any change in respect of the roasting operation.

The annexed drawings represent devices for carrying out the invention.

Figure 2:
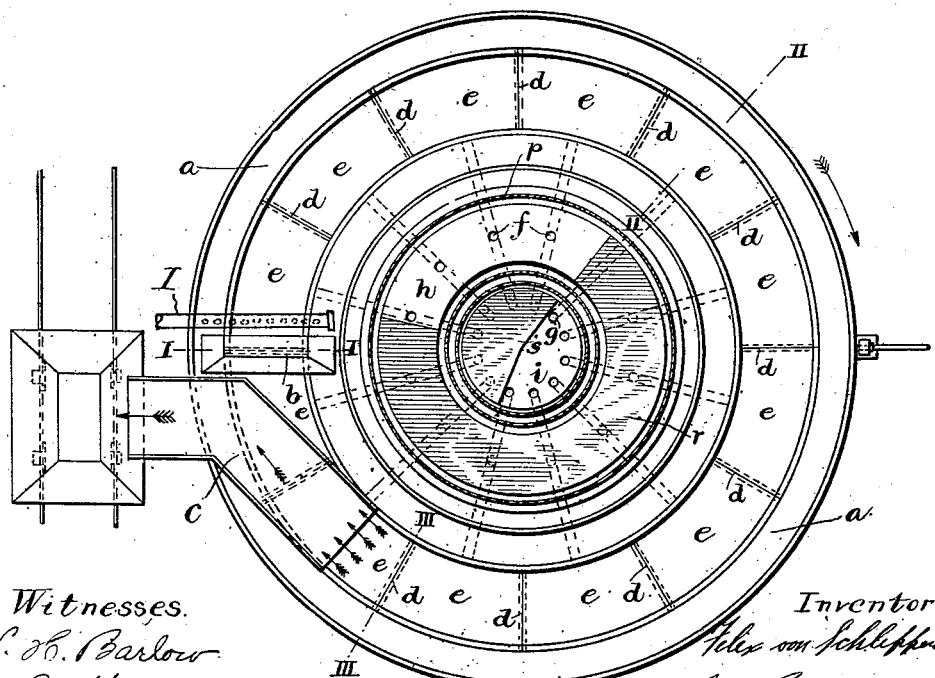
Figure 3:
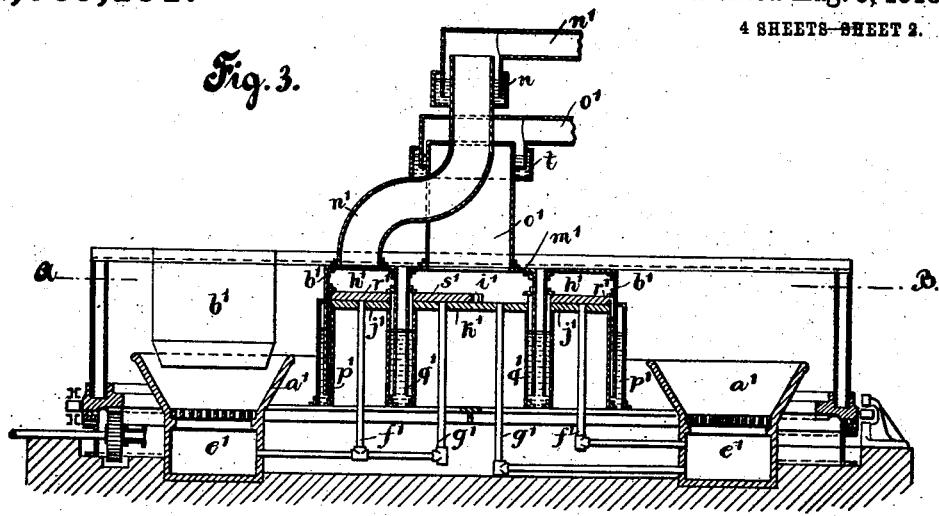
Figure 4:
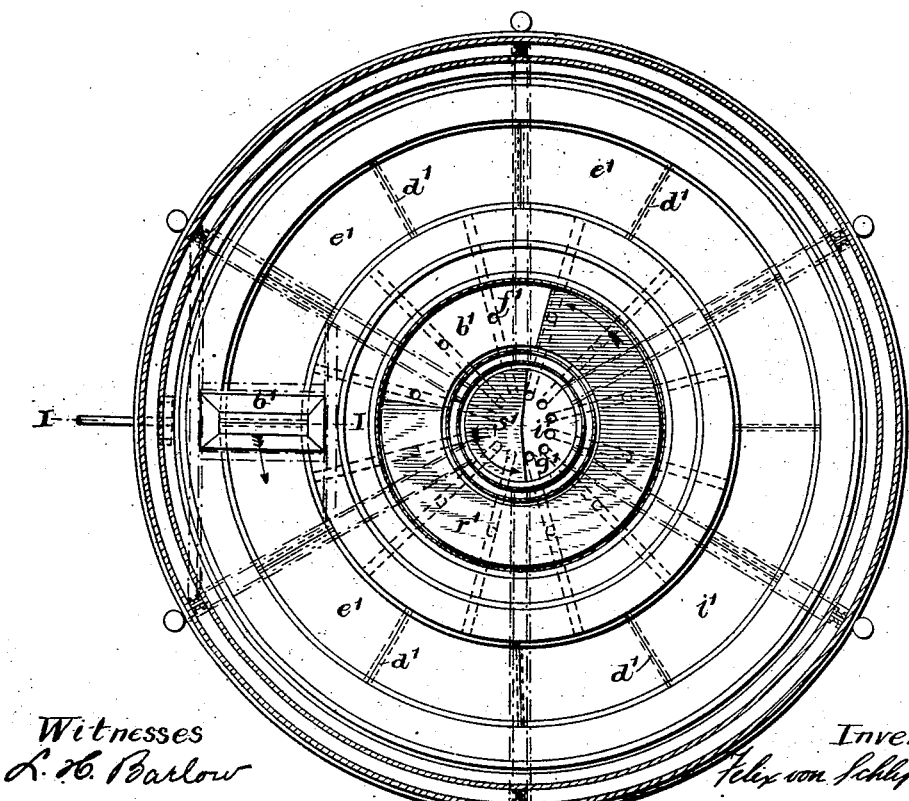
Figure 5:
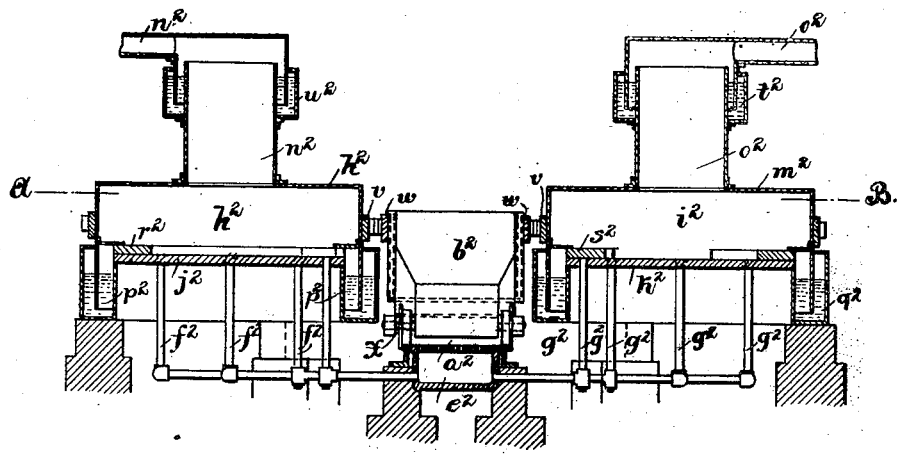
Figure 6:
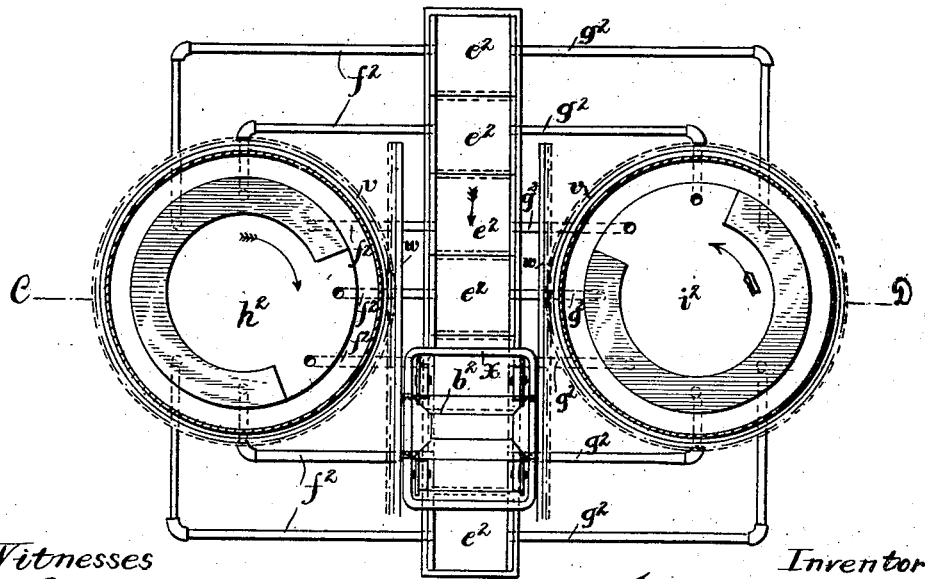
Figure 7:
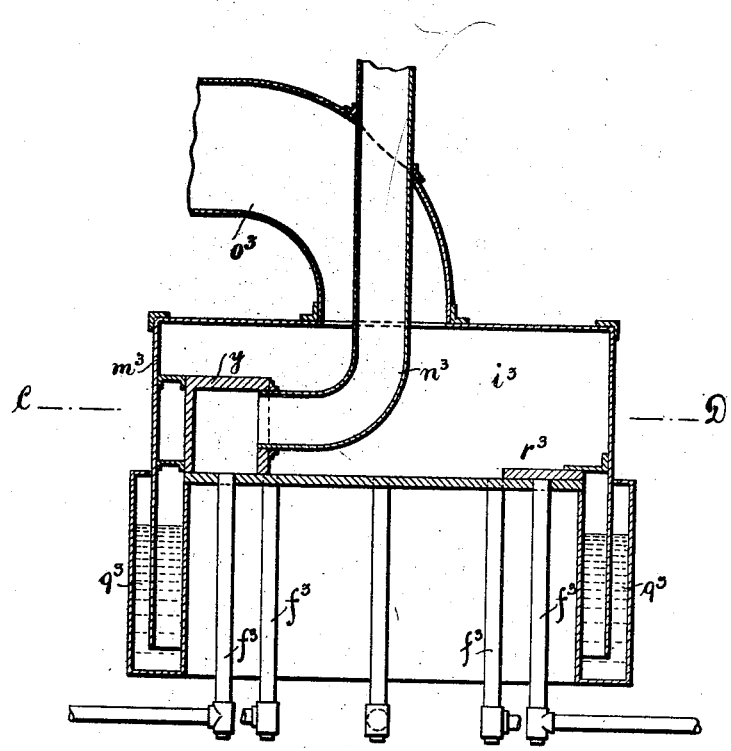
Figure 8:
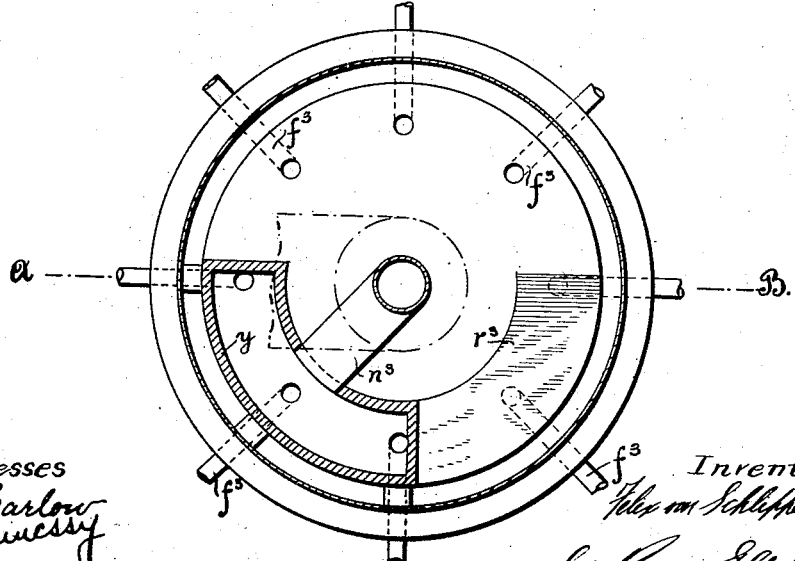

Figures 1 and 2 are a vertical section and a plan-view respectively, of an arrangement suitable for carrying out the invention in a furnace with an annular rotary grate charged through a stationary feeding device. Figs. 3 and 4 show, in section and in plan-view respectively, an arrangement for carrying out the invention by means of a furnace with an annular stationary grate charged through a feeding device movable above the grate. Figs. 5 and 6 show an arrangement adaptable to a straightline furnace with a stationary grate charged from a feeding device which is moved above it. Figs. 7 and 8 show another arrangement for carrying the invention into effect, which can be applied to furnaces with movable grate and stationary feeding device, as well as to furnaces with stationary grate and movable feeding device.

In the device shown in Fig. 1, $a$ is the annular grate rotatable around a vertical axis by any suitable means, for instance by means of toothed wheels; $b$ is a stationary feeding device, for instance a hopper, with an opening at the bottom, the length of which corresponds to the width of the grate.

When the grate is caused to rotate, it moves underneath the opening of the hopper $b$ whereby a layer of fresh material is spread upon the grate. This fresh layer of material is brought to ignition in any suitable way as by the ignition means I and a current of air is forced through the ignited mass, the grate with the ignited mass continuing its motion in the direction of the arrow. In the beginning, roasting gases are produced which are rich in sulfur dioxid. During the progression of the grate, the ore is more and more desulfurized, and by the time the section of the grate previously charged underneath the hopper $b$ with fresh material has reached a certain line for example II—II of the circular path of the grate, the desulfuration of the material under treatment upon the respective grate section has advanced to such a degree, that at the subsequent treatment the roasting gases produced will be too low in sulfur dioxid to be utilized for the manufacture of sulfuric acid. This condition of the material under treatment will be maintained during the advance motion of the respective grate section say from the line II—II to the line III—III. After this section has reached the line III—III, the desulfuration will be as complete as required and the treated material is removed from the grate in the known manner by means of an appropriate discharge device $c$. Thus between the lines I—I and II—II rich gases will be produced, whereas between the lines II—II and III—III poor gases are produced.

With a view to carry off the rich gases separately from the poor ones and to secure an uninterrupted gas current in each of the two collecting chambers, the following arrangement has been provided: The inclosed space underneath the grate $a$ is divided, as is well known, by means of partitions $d$ into several compartments $e$ the number of which may vary. From each of these compartments $e$ two conduits $f$ and $g$ lead off, the delivery ends of which open into the bottom parts $j$ and $k$ of two separate chambers $h$ and $i$ serving as collectors for the gases. The chamber $h$ is formed by means of an annular bell $l$, the chamber $j$ by means of a cylinder-shaped bell $m$. From each of these bells branch off conduits $n$ and $o$ which deliver the gases to any desired spot, for instance to the chambers for the manufacture of sulfuric acid, or to the stack. The bells $l$ and $m$ are immersed in annular tanks $p$ and $q$ filled with water, sand, glycerin or the like, with a view to sealing the chambers $h$ and $i$ against the outer air.

To the inner walls of each of the bells, and closely above the bottoms $j$ and $k$, upon the end of the conduits $f$ and $g$, there are fastened sliding closing pieces, for instance plates $r$ and $s$, the dimensions of which are such as to always cover a certain number of the openings of the gas conduits $f$ and $g$, while the openings of all the other conduits $f$ and $g$ are left free. The bottoms $j$ and $k$ of the collecting chambers $h$ and $i$ are connected with the tanks $p$ and $q$ and are supported by the conduits $f$ and $g$. When the grate $a$ of the furnace is caused to rotate, the conduits $f$ and $g$ rotate with them and hence the bottoms $j$ and $k$ with the tanks $p$ and $q$ participate in the rotation.

The number of the openings closed by the plates $r$ and $s$ will be determined by the number of the compartments $e$ being between the lines II—II and III—III and between the lines I—I and II—II respectively.

In the roasting apparatus shown in the drawing, the part of the grate between the lines III—III and I—I is left empty for enabling the grate to cool prior to its being fed with fresh material through the feeding device. In order to prevent any admission of atmospheric air to the collecting chambers through this empty part of the grate, the gas conduits $f$ and $g$ must, for the time they are between the lines III—III and I—I be kept closed by the plates $r$ and $s$. To this end the length of both plates $r$ and $s$ has been extended sufficiently, so that the plates cover also the mouths of the gas conduits $f$ and $g$ which are between the lines III—III and I—I.

By means of the arrangement hereinbefore described, the present invention may be carried out in the following manner: As stated before, the gases produced between the lines I—I and II—II are sufficiently rich to be availed of for the manufacture of sulfuric acid, whereas the gases arising between the lines II—II and III—III are too poor to be made use of for the manufacture of sulfuric acid, and are to be directed into the stack. Provision must therefore be made to draw off separately the gases developed between the lines I—I and II—II and the gases produced between the lines II—II and III—III, and this in such a way as to realize uninterrupted currents of gas. In the position shown in the drawing, all the compartments $e$ which are just between the lines I—I and II—II, are connected, by means of the conduits $f$, with the annular collecting chamber $h$, owing to the fact that the mouths of the corresponding conduits $f$ are left uncovered by the plate $r$; all the other gas conduits $f$ emptying into the collecting chamber $h$ are closed, their mouths being covered by the plate $r$. On the other hand all the compartments $e$ which are between the lines II—II and III—III are in communication with the central collecting chamber $i$ as the mouths of the corresponding conduits $g$ between these lines are left free by the plate $s$; whereas all the other compartments $e$ are closed to the central collecting chamber $i$, as the mouths of the corresponding conduits $g$ are covered by the plate $s$. In the position shown in the drawing, the rich gases developed between the lines I—I and II—II will thus be directed into the outer collecting chamber $h$ whence they may be drawn off to the place of subsequent treatment (for instance the sulfuric acid chambers). The poor gases developed between the lines II—II and III—III will flow into the central collecting chamber $i$ whence they may be drawn off to the stack or to any other place. When the grate $a$ with the compartments $e$ and conduits $f$, $g$ is being rotated, the rotating motion will be imparted also to the bottom parts $j$ and $k$ and the tanks $p$ and $q$, while the bells $l$ and $m$ and the plates $r$ and $s$ connected thereto will remain stationary. In consequence thereof the mouths of the gas conduits $f$ which hitherto were open to the collecting chamber $h$, will successively pass beneath the plate $r$, thus shutting off the compartments corresponding to these mouths from the outer collecting chamber $h$. Simultaneously the compartments $e$ shut hitherto against the collecting chamber $h$ will be opened to the same by reason of the fact that the mouths of the corresponding conduits $f$ will successively emerge from beneath the plate $r$, whereby communication is established between the corresponding compartments $e$ and the collecting chamber $h$. On the other hand, during the rotation of the grate, the mouths of the conduits $g$ hitherto closed by the plate $s$ will appear, one after the other, from beneath the plate $s$, and the compartments $e$ corresponding to these mouths will thus be brought into communication with the inner collecting chamber $i$, whereas the mouths of the conduits $g$ hitherto open to the collecting chamber $i$, will be closed by reason of their passing underneath the plate $s$ whereby also the respective compartments $e$ will be closed to the collecting chamber $i$.

It will be seen from the foregoing that during the rotation of the grate the compartments $e$ which are between the lines I—I and II—II will be constantly in communication with the outer collecting chamber $h$, whereas the compartments $e$ which are between the lines II—II and III—III will always be in communication with the collecting chamber $i$. Thus in the collecting chamber $h$ there will be an uninterrupted current of the rich gases developed between the lines I—I and II—II, whereas an uninterrupted current of the poor gases developed between the lines II—II and III—III will flow into the collecting chamber $i$.

To each of the two pipes $n$ and $o$ directing the gases from the collecting chambers $h$ and $i$ to the place of their further treatment or to the stack, there is connected a suction device, (for instance a fan) sucking the air from the top of the charge across the latter and causing the roasting gases gathering in the compartments $e$ to flow through the conduits $f$ and $g$ into the collecting chambers $h$ and $i$.

By providing a separate suction device for each collecting chamber, the further advantage is realized that it is possible to control, in a different manner, the admission of air to the different parts of the grate producing either rich or poor gas, thus it will be possible to supply the part of the grate producing poor gases with a greater quantity of air or with air under higher pressure than the part in which rich gases are produced, or vice versa.

In the device shown in Figs. 3 and 4 the annular grate $a^1$ is stationary, the feeding device $b^1$ being moved above the grate. In this mechanical roasting device already known, the roasting process is going on in the following manner: The feeding device $b^1$ on its travel starting for instance at the line I—I, supplies the grate $a^1$ with a layer of fresh material, which is ignited at the same time. An air current is sent across the ignited material, whereupon the desulfuration begins together with the production of roasting gases with a high content of sulfur dioxid. According as the feeding device is removing more and more from its starting point I—I, the percentage of sulfur dioxid in the roasting gases produced upon the grate sections nearest to the starting point will gradually decrease, and by the time the feeding device has reached a certain point of its path, the gases arising from the grate sections nearest to the starting point will have such a low content of sulfur dioxid as to be of no avail for the manufacture of sulfuric acid. In the meantime however, other sections $e$ of the grate will have received fresh material from the feeding device $b^1$ and it is in these sections that rich gases are now being produced.

In order to recover in this kind of roasting device the rich gases separately from the poor ones, an arrangement might be made use of analogous to that described above with reference to the Figs. 1 and 2. No other modification would be required than to provide stationary bottoms $j^1$ and $k^1$ of the collecting chambers $h^1$ and $i^1$ with stationary tanks $p^1$ and $q^1$, whereas the bells $l^1$ and $m^1$ will rotate with the feeding device $b^1$. To this end the pipes $n^1$ and $o^1$ connected with the bells, are provided with annular receptacles $t$ and $u$ filled with water, sand, glycerin or the like, in which the stationary parts of the pipes $n^1$ and $o^1$ are immersed.

Owing to the fact that the rotary motion of the feeding device $b^1$ will be imparted to the bells $l^1$ and $m^1$, the plates $n^1$ and $s^1$ fastened to the bells will be moved above the mouths of the gas conduits $f^1$, $g^1$ which are arranged upon the stationary bottoms $j^1$ $k^1$ of the collecting chambers and these mouths will be opened and closed according to the respective positions of the feeding device $b^1$. It is evident that in this manner the same effect will be realized as in the device shown in Figs. 1 and 2 and described hereinbefore, i. e. an uninterrupted current of rich gases will pass into the collecting chamber $h^1$ and an uninterrupted current of poor gases into the collecting chamber $i^1$. There will be but one difference in the working of the process with either of the two arrangements, in that with the device of Figs. 1 and 2, the development of the rich gases on the one hand, and of the poor gases on the other hand, will always take place upon the same part of the hearth circuit, and thus the sections of the grate will be opened and closed always at one fixed point, whereas in the device according to Figs. 3 and 4, the position of the places at which the rich gases and the poor ones are developed, will change in a progressive manner throughout the operation so that in the latter case the compartments will be opened and closed at fixed intervals of time.

Figs. 5 and 6 show the invention adapted to a furnace with a stationary straight-lined grate above which the feeding device is moved. The roasting operation goes on in this furnace in substantially the same manner as in the furnace of Figs. 3 and 4. There is but one difference in that, in the furnace shown in Figs. 5 and 6, the feeding device after having reached the end of its rectilinear path, has to be carried back to its starting point without supplying the grate with material. In order to adapt the invention to this roasting furnace with rectilinear grate, each of the separate compartments underneath the grate has again been provided with conduits for directing the gases to each of the collecting chambers $h^2$ $i^2$. In the drawing these collecting chambers are represented in the form of two adjacently arranged bells $l^2$ and $m^2$; the rotation of the bells $l^2$ and $m^2$ may be effected for instance by providing the bells with a toothed wheel $v$ engaging with a rack $w$ fixed to the carriage $x$, which supports the feeding device $b^2$. During the return stroke without load of the feeding device $b^2$ and the carriage $x$, the bells $l^2$ and $m^2$ must of course remain stationary; to this end appropriate devices have to be provided for disengaging the racks $w$ from the toothed wheels $v$.

The closing and opening of the mouths of the gas conduits $f^2$ and $g^2$ in the collecting chambers $h^2$ and $i^2$ will thus be effected in the same way as in the device of Figs. 3 and 4, and hence in the furnace according to Figs. 5 and 6, there will likewise be obtained an uninterrupted current of rich gases in one collecting chamber and an uninterrupted current of poor gases in the other chamber.

It is to be noticed that, as shown in the drawing, the distance between the discharge ends of the two outermost gas conduits upon the bottom of the collecting chambers is twice the distance between the mouths of the other gas conduits. This arrangement is necessary for the reason that the heated matter has to be discharged from the outermost sections of the grate, at which the stroke of the feeding hopper begins, before fresh material can be delivered by the feeding device. The discharge of this first grate section takes place however at the time during which the other extreme section of the grate at the end of the path of the feeding hopper is producing rich gases and must thus be closed against the collecting chamber of poor gases. On the other hand the first section of the grate, while being discharged, must be closed against both of the collecting chambers in order to prevent any admission of atmospheric air to these chambers. It will be seen that the condition, to, on the one hand, shut the last section of the grate against one of the collecting chambers, the first section on the other hand against both collecting chambers at the beginning of the path of the feeding device, is brought about by doubling the distance between the mouths of the two outmost gas conduits.

The removal of the treated material from the grate of the rectilinear furnace is effected in any suitable way known to those skilled in the art.

It is evident that the devices described, in which bells immersing into water receptacles are made use of as collecting chambers, and plates fastened to the bells as closing devices, might be replaced by any other devices answering the same purposes. The bells immersed in the receptacles filled with water might be replaced by any other devices permitting a reciprocal motion of the two parts of the collecting chambers. A suitable device for replacing the bell is shown by way of example in the Figs. 7 and 8. In this arrangement the closing plates are replaced by a box-like sliding piece $y$ which covers a certain number of the conduit-mouths. To this sliding box $y$ is connected an exit-pipe $n^3$ through which the gases may pass to the place of further treatment or to the stack. In order to maintain covered also the mouths of the gas conduits corresponding to the empty part of the grate, a plate $r^3$ is connected with the sliding box which covers a number of conduit mouths corresponding to the empty part of the grate. The sliding box $y$ with plate $r^3$ are connected with the bell $m^3$ and participate in its rotation in the same manner as the closing plates in the devices described above. It will be seen that the sliding box $y$ replaces one of the bells made use of in connection with the devices described above. The gases coming from the conduit mouths covered by the box are collected in the box and then drawn off through the pipe $n^3$. The gases flowing through the conduit mouths left uncovered by the box $y$, and plate $r$, will pass into the collecting chamber $i^3$ formed by the bell $m^3$ and may thus be drawn off separately from the gases collected in the box $y$.

The device shown in Figs. 7 and 8 may of course be made use of in connection with a stationary grate as well as with a rotary grate. This device is likewise adaptable in the case of a straight line grate and with collecting chambers with a to-and-fro motion.

In the foregoing but two collecting chambers are spoken of, and accordingly two kinds of gases to be drawn off separately. There might of course be obtained also three or more different currents of gas by increasing the number of the collecting chambers accordingly.

Having thus fully described the nature of my invention, I claim as new and desire to secure by Letters Patent:

1. The process of recovering separately the richer gases and the poorer gases in roasting operations, which consists in feeding upon a roasting hearth a layer of ore to be roasted, maintaining the body of ore stationary upon the roasting hearth during the roasting operation, subdividing the ore body into a plurality of individual roasting sections each producing gases of different percentages of sulfur dioxid with respect to the other roasting sections and the composition of gases evolved at one and the same roasting section varying in the course of the roasting operation, conveying the richer and the poorer gas currents respectively of each roasting section to separate collecting places and connecting the roasting sections with the gas collecting places according to the composition of the gas then produced at said roasting sections, in such manner that each gas collecting place shall be furnished with an uninterrupted current of gas of substantially constant average quality; substantially as described.

2. Apparatus for recovering separately the richer and poorer gases in a roasting plant having a plurality of roasting places at which, at different stages of the roasting process, gases of different percentages of sulfur di-oxid are produced, separate collecting receptacles for each of the different kinds of gases, conduits from each of the roasting places to each of the collecting receptacles, and means for opening and closing the conduits in accordance with the stage to which the roasting operation has progressed at the several roasting places, to obtain an uninterrupted flow of gases of the desired quality to each collecting receptacle; substantially as described.

3. Apparatus for recovering separately the richer and poorer gases given off in the roasting of sulfur-bearing ores, by mechanical-roasting apparatus comprising a roasting hearth divided into a plurality of roasting places, means for progressively removing the roasted material from, and supplying fresh material to be roasted to, the hearth, separate collecting receptacles for the richer gases and for the poorer gases, respectively, conduits from each of the roasting places to each of the receptacles, and means for opening and closing the conduits in accordance with the stage to which the roasting operation has progressed at the several roasting places, to obtain an uninterrupted flow of gases of the desired quality to each collecting receptacle; substantially as described.

4. The combination with mechanical ore-roasting apparatus having a roasting-hearth divided into a plurality of roasting places and means for progressively removing the roasted material from, and supplying fresh material to be roasted to, the hearth, of means for recovering separately the richer and poorer gases given off in the roasting operation, comprising separate collecting receptacles for the richer gases and for the poorer gases, respectively, conduits from each of the roasting places to each of the receptacles, and means for opening and closing the conduits in accordance with the stage to which the roasting operation has progressed at the several roasting places, to obtain an uninterrupted flow of gases of the desired quality to each collecting receptacle; substantially as described.

5. The combination with mechanical ore-roasting apparatus having a charging-hopper and a roasting-hearth divided into a plurality of roasting places, said hearth and hopper being relatively movable so that the material to be roasted may be progressively supplied to and removed from the hearth, of means of recovering separately the richer and poorer gases given off in the roasting operation, comprising separate collecting receptacles for the richer gases and for the poorer gases, respectively, each of said receptacles comprising a bell and a bottom-part movable with respect to one another, conduits from each of the roasting places to each of the receptacles, mechanical connections between the movable elements of the receptacles and the movable element of the roasting apparatus, and conduit-opening and closing means actuated by the relative movement of the receptacle parts, whereby the conduits are connected with the receptacles in accordance with the stage to which the roasting operation has progressed at the several places and an uninterrupted flow of gas of the desired quality to each collecting receptacle is obtained; substantially as described.

6. The combination with mechanical ore-roasting apparatus having a charging-hopper and an annular roasting-hearth divided into a plurality of roasting places, said hearth and hopper being relatively movable so that the material to be roasted may be progressively supplied to and removed from the hearth, of means of recovering separately the richer and poorer gases given off in the roasting operation, comprising separate collecting receptacles for the richer gases and for the poorer gases, respectively, said collecting receptacles being concentrically arranged within the annular hearth, each of said receptacles comprising a bell and a bottom-part movable with respect to one another, conduits from each of the roasting places to each of the receptacles, mechanical connections between the movable elements of the receptacles and the movable element of the roasting apparatus, and conduit-opening and closing means actuated by the relative movement of the receptacle parts, whereby the conduits are connected with the receptacles in accordance with the stage to which the roasting operation has progressed at the several places to obtain an uninterrupted flow of gas of the desired quality to each collecting receptacle; substantially as described.

7. The combination with mechanical ore-roasting apparatus having a charging hopper and a roasting hearth divided into a plurality of roasting places, said hearth and hopper being relatively movable so that the material to be roasted may be progressively supplied to and removed from the hearth, of means of recovering separately the richer and poorer gases given off in the roasting operation, comprising separate collecting receptacles for the richer gases and for the poorer gases, respectively, each of said receptacles comprising a bell and a bottom-part movable with respect to one another, conduits from each of the roasting places to one of the relatively movable parts of each of the receptacles, mechanical connections between the movable elements of the receptacles and the movable element of the roasting apparatus, and a conduit-closing plate carried by that element of each of the receptacles to which the conduits are not led, whereby the conduits are connected with the receptacles in accordance with the stage to which the roasting operation has progressed at the several places to obtain an uninterrupted flow of gas of the desired quality to each collecting receptacle; substantially as described.

FELIX von SCHLIPPENBACH.

In the presence of—
W. J. REUTERS,
HENRY QUADFLIEG.